United States Patent
Sari et al.

(10) Patent No.: US 10,243,776 B2
(45) Date of Patent: Mar. 26, 2019

(54) ENHANCED SPATIAL MULTIPLEXING

(71) Applicant: Sequans Communications S.A., Colombes (FR)

(72) Inventors: Hikmet Sari, Colombes (FR); Serdar Sezginer, Colombes (FR)

(73) Assignee: Sequans Communications S.A., Colombes (FR)

( * ) Notice: Subject to any disclaimer, the term of this patent is extended or adjusted under 35 U.S.C. 154(b) by 0 days.

(21) Appl. No.: 15/336,504

(22) Filed: Oct. 27, 2016

(65) Prior Publication Data

US 2017/0126463 A1 May 4, 2017

(30) Foreign Application Priority Data

Oct. 28, 2015 (EP) .................................... 15306723

(51) Int. Cl.
*H04L 1/00* (2006.01)
*H04L 1/06* (2006.01)
(Continued)

(52) U.S. Cl.
CPC ....... *H04L 27/3483* (2013.01); *H04B 7/0413* (2013.01); *H04L 1/0003* (2013.01); *H04L 1/003* (2013.01); *H04L 1/0063* (2013.01); *H04L 1/0612* (2013.01); *H04L 27/0008* (2013.01); *H04L 27/3433* (2013.01); *H04L 27/3488* (2013.01)

(58) Field of Classification Search
CPC ................ H04L 1/0003; H04L 1/003; H04L 2025/0342; H04L 27/0008; H04L 27/3488; H04L 27/362; H04L 27/3483; H04L 27/3433; H04L 1/0063; H04L 1/0612; H04B 7/0413; H04B 7/0697
See application file for complete search history.

(56) References Cited

U.S. PATENT DOCUMENTS 9,432,097 B2 * 8/2016 Sezginer .................. H04L 1/06
2016/0366003 A1 * 12/2016 Kwon ................... H04L 1/0001
2017/0126301 A1 * 5/2017 Taherzadehboroujeni .................
H04B 7/0669

FOREIGN PATENT DOCUMENTS

EP          2 924 905         9/2015

OTHER PUBLICATIONS

Cheng et al., "Enhanced spatial modulation with multiple constellations," 2014 IEEE International Black Sea Conference on Communications and Networking (BlackSeaCom), Odessa, Jul. 2014, pp. 1-5.*

(Continued)

*Primary Examiner* — Michelle M Koeth
(74) *Attorney, Agent, or Firm* — Hamilton, Brook, Smith & Reynolds, P.C.

(57) ABSTRACT

A method of spatially multiplexing data comprising a signal vector, the method comprising selecting first and second modulation schemes for the data transmission wherein the second modulation scheme is an interpolation in the plane of the first modulation scheme; and further wherein the modulation schemes are selected so as to maintain the same minimum Euclidean distance between vectors comprising the first and second modulation schemes as the minimum Euclidean distance within the first and second modulation schemes; and selecting a plurality of antennae, each of the plurality to concurrently transmit respective symbols of the signal vector.

13 Claims, 2 Drawing Sheets

(51) Int. Cl.
*H04L 27/00* (2006.01)
*H04L 27/34* (2006.01)
*H04B 7/0413* (2017.01)

(56) References Cited

OTHER PUBLICATIONS

Cheng et al., "New signal design for enhanced spatial modulation with multiple constellations," 2015 IEEE 26th Annual International Symposium on Personal, Indoor, and Mobile Radio Communications (PIMRC), Hong Kong, Sep. 2, 2015, pp. 872-876.*

Cheng et al., "Enhanced Spatial Modulation With Multiple Signal Constellations," in IEEE Transactions on Communications, vol. 63, No. 6, pp. 2237-2248, Jun. 2015.*

Extended European Search Report for EP Application No. 15306723.6, dated Mar. 17, 2016.

* cited by examiner

ENHANCED SPATIAL MULTIPLEXING

RELATED APPLICATION

This application claims priority under 35 U.S.C. § 119 or 365 to European Application No. 15306723.6, filed Oct. 28, 2015. The entire teachings of the above application are incorporated herein by reference.

TECHNICAL FIELD

This invention relates to enhanced spatial multiplexing of a data stream to be transmitted. It is particularly suitable for, but by no means limited to, the transmission of serial data symbols with reduced transmitted signal power.

BACKGROUND

Multiple-input multiple-output (MIMO) technologies are now commonly used in wireless communications systems to improve throughput, performance, or both. The main limitation of MIMO systems in practice is related to their implementation complexity, which increases linearly with the number of antennas. A class of MIMO, which is known as Spatial Modulation (SM), was introduced for wireless systems in which the number of RF chains in the transmitter is smaller than the number of antennas. Since the number of RF chains is restricted, all antennae cannot be active simultaneously. The basic principle of SM comprises selecting the indexes of the active antennae using information bits. Additional information bits are transmitted through the symbols transmitted from the active antennae.

As not all transmit antennae are active at the same time, SM suffers from limited throughput compared to spatial multiplexing (SMX), which transmits symbols in parallel from all of the antennae.

SM techniques provide a limited throughput compared to SMX when the number of transmit antennae are the same. In fact, from the perspective of throughput, SMX provides the upper limit for all MIMO techniques. A disadvantage of SMX is limited performance and high decoder complexity.

There is, therefore, a need to provide a more efficient method of spatial multiplexing.

SUMMARY

According to a first aspect there is provided a method of transmitting data comprising a signal vector as defined in Claim 1 of the appended claims. Accordingly, there is provided a method of transmitting data comprising a signal vector, the method comprising selecting first and second modulation schemes for the data transmission wherein the second modulation scheme is an interpolation in the plane of the first modulation scheme; and further wherein the modulation schemes are selected so as to maintain the same minimum Euclidean distance between vectors comprising the first and second modulation schemes as the minimum Euclidean distance within the first and second modulation schemes and selecting a plurality of antennae, N, to concurrently transmit respective symbols of the signal vector.

Optionally, the method wherein the first modulation scheme comprises a first constellation and the second modulation scheme comprises a second constellation.

Optionally, the method wherein a portion of the symbols taking their values from the first modulation scheme take their values from a subset of the first modulation scheme.

Optionally, the method wherein the points of the subset of the first modulation scheme have reduced energy compared to the other points of the first modulation scheme.

Optionally, the method wherein the modulation schemes are chosen so that the points of any one modulation scheme are equidistant from the neighbour points of any one other modulation scheme.

Optionally, the method of any preceding claim wherein the number of components from the transmitted signal vector taking their value from the second modulation scheme is even.

Optionally, the method of any preceding claim wherein one component on the signal vector takes its value from the first modulation scheme and N−1 components on the signal vector take their values from either the secondary modulation scheme or the subset of the first modulation scheme.

Optionally, the method wherein third and fourth constellations are provided by a second interpolation.

Optionally, the method wherein the minimum Euclidean distance within the third and fourth constellations is the same as the minimum Euclidean distance within the first and second constellations.

Optionally, the method wherein the minimum Euclidean distance between vectors comprising each constellation is the same.

Optionally, the method wherein the combinations of modulation schemes used to transmit the signal vector are represented by two binary sequences.

Optionally, the method wherein one binary sequence forms a repetition code and the other binary sequence forms a parity-check code.

Optionally, the method wherein only points of the subset of the first modulation scheme are used.

Optionally, the method wherein the fourth constellation is a $\pi/2$ rotation of the third constellation.

Optionally, the method wherein an additional four constellations are derived from an additional interpolation and used to increase the number of modulation combinations.

Optionally, the method wherein all antennae concurrently transmit.

Optionally, the method wherein each constellation comprises a 4-point constellation.

Optionally, the method wherein the first modulation scheme comprises 16QAM.

Optionally, the method wherein the first modulation scheme comprises 64QAM.

According to an aspect there is provided a system comprising a plurality of antennae to transmit a signal vector according to the method.

Optionally, the system further comprises a receiver arranged to receive the signal vector and to determine the data transmitted.

According to an aspect there is provided a non-transitory computer readable medium as comprising instructions that when executed by a processor cause the processor to carry out the method.

According to an aspect there is provided computer code comprising instructions that when executed by a processor cause the processor to carry out the method.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

Overview

An enhanced SMX (E-SMX) technique is disclosed which provides a signal-to-noise ratio (SNR) gain of several dB compared to conventional SMX. This new concept is based on using multiple signal constellations derived through geometric interpolation. Specific example schemes for varying numbers of transmit antennae are discussed that use 16QAM as primary modulation. Other modulations can also be used such as 64QAM, 256QAM, 1024QAM etc. As would be understood, the real and imaginary parts of 16QAM symbols take their values from the set $\{\pm1, \pm3\}$ (see FIGS. 1 to 3) and those of 64QAM symbols take their values from the set $\{\pm1, \pm3, \pm5, +7\}$, for example.

The basic principle of E-SMX is discussed with reference to SMX with 16QAM modulation and four transmit antennae (4-TX):

In this example, the signal space is given by:

$$\mathcal{L} = P_{16}P_{16}P_{16}P_{16} \quad (1)$$

where $P_{16}$ designates a 16QAM signal constellation (the P denotes a primary modulation technique).

Let us denote the transmitted signal vector by $X=(x_1, x_2, x_3, x_4)$. Here, we have $x_i \in P_{16}$, for $i=1, 2, 3, 4$.

When each antenna transmits a 16QAM symbol, the spectral efficiency is 16 bits per channel use (bpcu). This is derived from 4 bits from each antenna.

Figure 1:
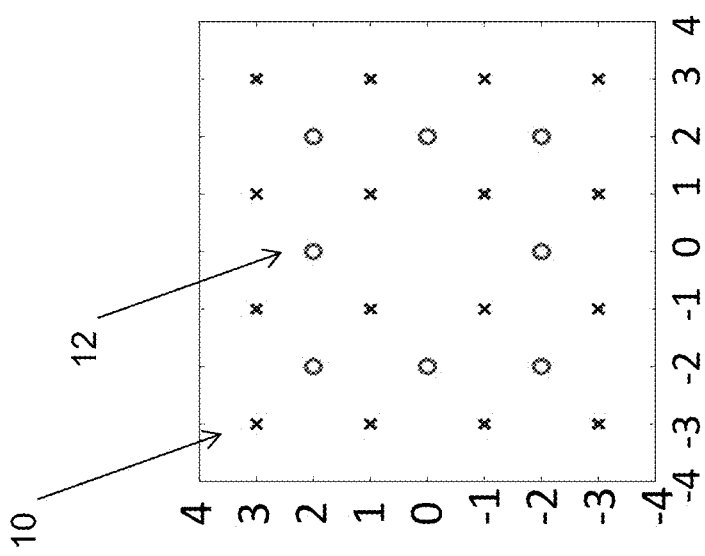
FIG. 1 illustrates the $P_{16}$ (primary) and $S_8$ (secondary) signal constellations according to an embodiment.

Using the conventional representation of 16QAM in which the in-phase (I) and quadrature (Q) components take their values from the set $\{\pm1, \pm3\}$ as shown in FIG. 1, the minimum Euclidean distance is $\delta_0=2$, (the distance between the crosses) and the average transmit energy of this SMX scheme is $E(X)=40$.

As is known, the transmit energy of any symbol is the real part squared plus the imaginary part squared. For the 16 available 16QAM symbols, the energies are 4×18, 4×2 and 8×10 which gives an average of 10. Since four symbols are transmitted in parallel, the average energy transmitted from the four antennae is 40. With N antennae, the signal space is $\mathcal{L} = P_{16}P_{16} \ldots P_{16}$, and the average transmit energy is $E(X)=10N$.

Described herein are two Enhanced SMX (E-SMX) techniques that provide improved signal-to-noise ratio (SNR) performance with the same spectral efficiency as known spatial multiplexing techniques. The principle is to use additional signal constellations to a primary modulation, where the additional constellations are derived through geometric interpolation in the primary signal modulation plane. The first technique, referred to as E-SMX-1, uses a single interpolation step, while the second technique, referred to as E-SMX-2, uses two interpolation steps. References to any particular modulation can be extended to any other suitable modulation. The terms modulation and constellation may be used interchangeably.

DETAILED DESCRIPTION

E-SMX-1 with 4 Transmit Antennae

In addition to the 16QAM modulation ($P_{16}$), which is used as primary modulation, a secondary modulation, which we refer to as $S_8$ is also used. The $S_8$ signal constellation 12 (circles) is illustrated in FIG. 1 along with the $P_{16}$ constellation 10 (crosses).

The secondary constellation 12 is derived by way of interpolation in the plane of the $P_{16}$ constellation.

The minimum Euclidean distance properties as shown in FIG. 1 are:

$$d_{min}(S_8)=d_{min}(P_{16})=\delta_0, \text{ and}$$

between $P_{16}$ and $S_8$ symbols:

$$d_{min}(P_{16},S_8)=\delta_0/\sqrt{2} \text{ from simple geometry}$$

In other words, the minimum distance of the $S_8$ constellation (12) is the same as that of $P_{16}$ (10) which is $\delta_0$ but the minimum distance between the two constellations is 3 dB lower (division by $\sqrt{2}$ results in a 3 dB reduction).

With a four antennae system, If we take a signal vector belonging to $(P_{16}, P_{16}, P_{16}, S_8)$ and one to $(P_{16}, P_{16}, S_8, S_8)$, it can be seen that the vectors differ by their third component only. The third component of the first vector is in the primary constellation, P, while the third component of the second vector is in secondary constellation, S.

The minimum distance between these two vectors is therefore the minimum distance between P and S, which is $\delta_0/\sqrt{2}$.

If we consider a signal vector belonging to $(P_{16}, P_{16}, S_8, S_8)$ and one to $(P_{16}, S_8, P_{16}, S_8)$ they differ in their second and third components.

As is well known, the squared distance between two vectors is the sum of the squared distances between their respective components. Therefore, the squared minimum distance between $(P_{16}, P_{16}, S_8, S_8)$ and $(P_{16}, S_8, P_{16}, S_8)$ is $\Delta^2=(\delta_0/\sqrt{2})^2+(\delta_0/\sqrt{2})^2=\delta_0^2$.

If we only consider signal vectors in which an even number of components (symbols) take their values from S, the two different vectors always differ by at least 2 components and the minimum squared distance is as above, $\Delta^2=(\delta_0/\sqrt{2})^2+(\delta_0/\sqrt{2})^2=\delta_0^2$.

Therefore, in order to maintain the minimum distance $\delta_0$ in the signal space, the number of components of the transmitted signal vector X taking their values from the $S_8$ constellation must be even. In this way, two distinct vectors differ by at least two components, and the minimum distance is preserved.

With N antennae, the number of modulation combinations in the signal space is $2^{N-1}$.

Let us define a binary sequence $\{\alpha_i\}$, $i=1, 2, \ldots, N$, where $\alpha_i$ determines whether the transmitted signal vector component $x_i$ belongs to $P_{16}$ (10) or to $S_8$ (12). This sequence forms a parity-check code because the number of components in S (or in P) is an even number in order to have two different signal vectors differ by at least two components as discussed previously.

The signal space of E-SMX-1 with 4-TX and 16 bpcu can be written as:

$$\mathcal{L} = P_{16}P_{16}P_8P_8 \cup P_{16}P_8S_8S_8 \cup P_{16}S_8P_8S_8 \cup S_8P_{16}P_8S_8 \cup P_{16}S_8S_8 \\ P_8 \cup S_8P_{16}S_8P_8 \cup S_8S_8P_{16}P_8 \cup S_8S_8S_8S_8 \quad (2)$$

The combinations of (2) are those in which constellation S appears an even number of times. The first combination in equation (2) does not feature S, in combinations 2 to 7, S appears twice, and finally S appears 4 times in combination 8.

With 4 transmit antennas, the $(\alpha_1, \alpha_2, \alpha_3, \alpha_4)$ sequence carries 3 information bits, and these bits select one of the eight combinations in the signal space.

Since 3 information bits are needed to select one of eight combinations, the 4 symbols transmitted per block only need to carry 13 bits to make up the 16 bpcu.

As each $P_{16}$ symbol carries 4 bits, and each $P_8$ or $S_8$ symbol carries 3 bits, over the eight combinations, the bits per combination is 14 bits for the first block, 13 bits for each of the middle 6 blocks, and 12 bits for the $8^{th}$ block. This makes an average of 13 bits per block. When added to the 3 bits for selecting each block, a single block therefore conveys 16 bits of information on average.

Figure 2:
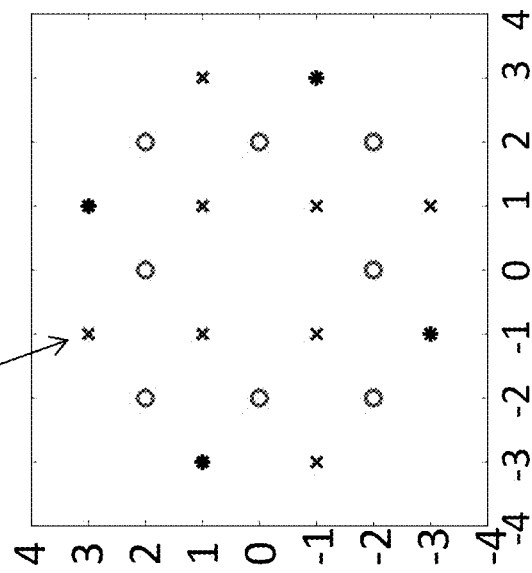
FIG. 2 illustrates a $P_8$ signal constellation according to an embodiment wherein $P_8$ denotes a subset of $P_{16}$.

Upon inspection it can be seen that half of the symbols taking their values from $P_{16}$ (10) do not actually need to take their values from the entire constellation, but instead from an 8-point subset. This reduced constellation, referred to as $P_8$ (20) is shown in FIG. 2, and preferably comprises the 8 points of lowest energy (the crosses), which may be derived by symmetry, for example. Any 8 points may be used. As shown, the corner points and the asterisk points are not used.

The average energy of the $S_8$ constellation is 6. As is known, the energy of a signal point is the sum of the squares of its real and imaginary parts. In the $S_8$ constellation, four points have an energy of 4, and four points have an energy of 8. The average value is therefore 6. The average energy of $P_8$ is also 6.

Therefore, the average transmit energy in this scheme (equation 2) is $E(X)=10+3\times6=28$.

The average transmit energy is explained with reference to equation 2 where the energy of the first block is 32 ($2\times10+2\times6$), 28 for each of the middle 6 blocks ($10+3\times6$), and 24 for the $8^{th}$ block ($4\times6$). This average of all blocks is 28. This is approximately 1.6 dB below that of conventional SMX which has an energy of 40.

E-SMX-1 with 8 Transmit Antennae

With 8 transmit antennas, the $\{\alpha_1, \alpha_2, \ldots, \alpha_8\}$ sequence, which determines to which constellation the transmitted signal vector components belong ($P_{16}$ 10 or $S_8$ 12) carries 7 information bits since 7 bits are needed to select one of the 128 modulation combinations in the signal space. Conventional SMX with 8 transmit antennas and 16QAM modulation carries 32 bpcu ($8\times4$ bits per antenna), therefore, the 8 symbols need to carry 25 bits to make up the 32 bpcu.

This means that only one of the symbols needs to take its values from a 16-point signal constellation and all the other symbols can take their values from an 8-point constellation ($4+7\times3=25$ bits of information). Since the $P_8$ (20) and $S_8$ 12 constellations have the same average energy of 6, the average energy of the transmitted signal vectors is $E(X)=10+7\times6=52$. In the same manner as for 4 transmit antennae, the average transmit energy is explained by the energy of the first block being 56 ($2\times10+6\times6$), 52 for each of the middle 6 blocks ($10+7\times6$), and 48 for the $8^{th}$ block ($8\times6$). This average of all blocks is 52.

The SNR gain with respect to conventional spatial multiplexing is:

$$G=10\cdot\log(80/52)\cong1.9 \text{ dB}.$$

where the 80 comes from average energy of 10 from the 8 symbols per conventional block.

For higher values of block length N (also the number of antennae), one component on the signal vector X takes its values from the $P_{16}$ constellation 10 and N−1 components take their values from the $P_8$ (20) or $S_8$ (12) constellations.

Asymptotically (when the number of transmit antennas becomes very large), the SNR gain associated to this E-SMX technique is:

$$G = \lim_{N\to\infty}\left[10\cdot\log\left(\frac{10N}{(N-1)6+10}\right)\right]$$
$$\cong 10\cdot\log\left(\frac{10}{6}\right) \cong 2.2 \text{ dB}.$$

E-SMX-2

A second E-SMX scheme provides higher SNR gains.

Figure 3:
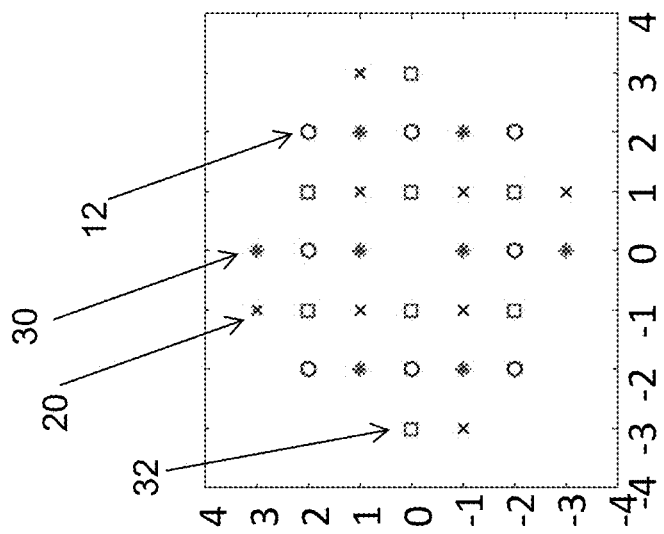
FIG. 3 illustrates $T_8$ and $F_8$ signal constellations along with the $P_8$ and $S_8$ constellations according to an embodiment.

The second enhanced SMX scheme herein disclosed uses four constellations, two of which are obtained through a second interpolation step in the primary constellation plane. The $P_8$ (20) and $S_8$ (12) constellations as used in E-SMX-1 are also used. The two constellations that are obtained after the second interpolation step are shown in FIG. 3 and are referred to as $T_8$ (30) and $F_8$ (32), respectively. The points of constellations T and F are located at equal distance from their neighbors in P and in S as would be understood.

The average transmit energy of the constellations arising from the second interpolations is given by $E(T_8)=E(F_8)=5$. AS can be seen from FIG. 3, the 8 points of each of T and F comprise individual points having energies of 9, 9, 5, 5, 5, 5, 1, and 1. The average, therefore, is 5.

The minimum Euclidean distance properties are as follows:

$d_{min}(T_8)=d_{min}(F_8)=\delta_0$ $d_{min}(T_8,F_8)=\delta_0/\sqrt{2}$ (3 dB decrease on conventional SMX)

and $d_{min}(P_8\cup S_8, T_8\cup F_8)=\delta_0/2$. (6 dB decrease on conventional SMX)

E-SMX-2 with 4 Transmit Antennae

Figure 4:
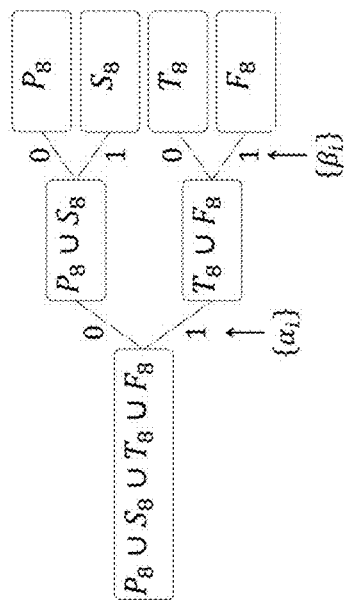
FIG. 4 illustrates two-step partitioning of constellations and corresponding bit-mapping according to an embodiment.

With a 4 transmit antenna example, the transmitted signal block is denoted by $X=(x_1,x_2,x_3,x_4)$. With reference to FIG. 4, two binary sequences are defined to determine the modulation combination to which the transmitted signal vector belongs. The binary sequences are denoted $(\alpha_1, \alpha_2, \alpha_3, \alpha_4)$ and $(\beta_1, \beta_2, \beta_3, \beta_4)$ respectively. For each value of the index i, the bit $\alpha_i$ determines whether the signal component $x_i$ belongs to $P_8\cup S_8$ or $T_8\cup F_8$, and the bit $\beta_i$ determines whether $x_i$ belongs to $P_8\cup T_8$ or $S_8\cup F_8$. This is illustrated in FIG. 4.

In order to preserve the minimum distance in the signal space, the $(\alpha_1, \alpha_2, \alpha_3, \alpha_4)$ sequence must form a repetition code (0,0,0,0 or 1,1,1,1), and the $(\beta_1, \beta_2, \beta_3, \beta_4)$ must form a parity-check code (number of 1's is even) as will be explained.

The distance between $P_8\cup S_8$ and $T_8\cup F_8$ being $\delta_0/2$, two signal vectors must differ in four components in terms of the associated alpha $(\alpha_n)$ sequences to preserve the minimum distance as $\Delta'^2=(\delta_0/2)^2+(\delta_0/2)^2+(\delta_0/2)^2+(\delta_0/2)^2=\delta_0^2$. This results in the $(\alpha_1, \alpha_2, \alpha_3, \alpha_4)$ sequence forming a repetition code (0,0,0,0 or 1,1,1,1).

The $\{\beta_n\}$ sequence which determines whether the components of X are in $P_8\cup T_8$ or $S_9\cup F_8$ must form a binary code of Hamming distance of 2 (parity-check code i.e. number of 1's is even). This is because the distance between $P_8\cup T_8$ and $S_8\cup F_8$ being $\delta_0/\sqrt{2}$, two signal vectors must differ in two components in terms of the associated beta $\{\beta_n\}$ sequences to preserve the minimum distance as $\Delta^2=(\delta_0/\sqrt{2})^2+(\delta_0/$ $\sqrt{2})^2 = \delta_0^2$. The reasoning for preserving this minimum distance is the same as that for E-SMX-1.

The repetition code carries 1 information bit (1 of two options), and the parity-check code carries 3 information bits (determines 1 of 8 options). Hence, the total number of information bits carried by the two sequences is 4. These bits select one combination out of the 16 combinations in the signal space. With 16 combinations in the signal space, all of the $x_i$ components in this code take their values from an 8-point constellation, and no 16-point constellations are needed to provide a spectral efficiency of 16 bpcu.

The average energy of the transmitted signal block in this technique is $E(X)=2\times6+2\times5=22$, This is because constellations $P_8$ and $S_8$ have an average energy of 6, and constellations $T_8$ and $F_8$ have an average energy of 5 as previously explained. On average, two components of the signal vector take their values from a constellation of energy 6, and two components take their values from a constellation of energy 5. The average energy of the signal vector is therefore $2\times6+2\times5=22$.

The SNR gain over conventional SMX is:

$$G=10\cdot\log(40/22)=2.6\text{ dB}.$$

where the 40 comes from average energy of 10 from the 4 symbols per conventional block.

E-SMX-2 with 8 Transmit Antennae

With 8 transmit antennae, the transmitted signal block is denoted by $X=(x_1, x_2, \ldots, x_8)$. The $\{\alpha_n\}$ sequence which determines whether the components of X are in $P_8\cup S_8$ or $T_8\cup F_8$ must form a binary code of Hamming distance of 4 (at least 4 components are different between any two signal blocks).

Binary code design is well documented. A convenient way to design a Hamming distance-4 code is to use the family of Reed-Muller codes. The $\{\alpha_n\}$ sequence carries 4 information bits, and the $\{\beta_n\}$ sequence carries 7 information bits. That is, 11 bits carried by these two sequences select a particular combination of modulations for the 8 components of the transmitted signal vector. From these, 8 bits compensate for reduction of the constellations from 16 to 8 points. The other 3 bits allow a further reduction of the constellation size from 8 to 4 for 3 components. Reducing the constellations from 8 to 4 points leads to significant additional energy savings.

The outermost points are dropped when the constellation size is reduced.

Below is a detailed analysis of this operation:

Dropping of the 4 outermost points of the $P_8$ constellation leads to a 4QAM signal constellation denoted $P_4$. This operation reduces the average energy from 6 to 2, which implies an energy saving of 66%.

Dropping the corner points of $S_8$ to derive $S_4$ reduces the average energy from 6 to 4, and this involves an energy saving of 33%.

Dropping the 4 points of highest energy from $T_8$ to derive $T_4$ reduces the average energy from 5 to 3, and this involves an energy saving of 40%.

The $F_8$ constellation is a $\pi/2$-rotated version of $T_8$, and therefore, the same energy saving applies to $F_8$ as to $T_8$ when the number of points is reduced to 4.

Assuming that all of these 4 modulations are equally affected, the transmitted average energy is reduced from $8\times10=80$ to $(3\times12+5\times22)/4=36.5$. The gain is $$G=10\cdot\log(80/36.5)=3.4\text{ dB}.$$

A more efficient solution comprises using a reduced $P_8$ constellation first, reduced $T_8$ and $F_8$ constellations next, and finally a reduced $S_8$ constellation as can be seen from the respective energy savings obtained.

E-SMX-2 with 16 Transmit Antennas

The transmitted signal block is denoted by $X=(x_1, x_2, \ldots, x_{16})$. The $\{\alpha_n\}$ sequence which determines whether the components of X are in $P_8\cup S_8$ or $T_8\cup F_8$ carries 11 information bits, and the $\{\beta_n\}$ sequence which determines whether the components of X are in $P_8\cup T_8$ or $S_8\cup F_8$ carries 15 information bits. That is, 26 bits carried by these two sequences select a particular combination of modulations for the 16 components of the transmitted signal.

From these, 16 bits compensate for reduction of the constellations from 16 to 8 points. The other 10 bits allow reducing the constellation size from 8 to 4 for 10 components.

Again, assuming that all modulations are equally affected, the transmitted average energy is reduced from $16\times10=160$ to $(10\times12+6\times22)/4=63$. The gain is $$G=10\cdot\log(160/63)=4.1\text{ dB}.$$

Asymptotically (when the number of transmit antennas goes to infinity), all components of the transmitted signal vector take their values from 4-point constellations and the SNR gain becomes:

$$G=10\cdot\log(10/3)=5.2\text{ dB}.$$

Further Interpolations

The Enhanced SMX technique described herein uses simple examples and can be generalized by proceeding to further interpolation steps to derive additional constellations. For example, a third interpolation step would derive 4 additional constellations, and this would further increase the number of modulation combinations when the number of transmit antennae is high enough to maintain the minimum Euclidean distance as would be understood from the disclosure herein.

In turn, the increased number of combinations would reduce the size of the constellations for a given spectral efficiency and consequently the transmitted signal power.

The 4, 8 and 16 antennae systems described herein are example embodiments. Any number of antennae, modulations, constellations and interpolations can be used to satisfy the criteria discussed herein that the minimum Euclidean distance be preserved with the minimum number of antennae transmitting concurrently.

For a given spectral efficiency with 16 bpcu as in the embodiments described herein, increasing gains in turn increase the SNR obtained depending on interpolations and number of antennae used.

In general, the techniques described herein increase the SNR performance for a given combination of antennae, modulations, constellations and interpolations.

The various methods described above may be implemented by a computer program. The computer program may include computer code arranged to instruct a computer, processor and/or system to perform the functions of one or more of the various methods described above. The computer program and/or the code for performing such methods may be provided to an apparatus and/or system, such as a computer or processor, on a computer readable medium and/or a computer program product. The computer readable medium could be, for example, an electronic, magnetic, optical, electromagnetic, infrared, or semiconductor system, or a propagation medium for data transmission, for example for downloading the code over the Internet. The computer readable medium could take the form of a physical computer readable medium such as semiconductor or solid state memory, magnetic tape, punch card, a removable computer diskette, a random access memory (RAM), a read-only memory (ROM), a rigid magnetic disc, and an optical disk, such as a CD-ROM, CD-R/W, DVD or Blu-ray. The computer readable medium may comprise non-transitory media as well as transmission media.

An apparatus such as a computer may be configured in accordance with such code to perform one or more processes in accordance with the various methods discussed herein.

The invention claimed is:

1. A method of spatially multiplexing data comprising a signal vector, the method comprising:
    selecting first and second modulation schemes for a data transmission wherein the second modulation scheme is an interpolation in the plane of the first modulation scheme; and further wherein the modulation schemes are selected so as to maintain the same minimum Euclidean distance between vectors comprising the first and second modulation schemes as the minimum Euclidean distance within the first and second modulation schemes; and
    selecting a plurality of antennae, each of the plurality to concurrently transmit respective symbols of the signal vector;
    wherein a portion of the respective symbols taking their values from the first modulation scheme take their values from a subset of the first modulation scheme; and wherein points of the subset of the first modulation scheme have reduced energy compared to other points of the first modulation scheme;
    wherein the first modulation scheme comprises a first constellation and the second modulation scheme comprises a second constellation;
    wherein third and fourth constellations are provided by a second interpolation;
    wherein a combination of modulation schemes used to transmit the signal vector is represented by two binary sequences, one of the two binary sequences forms a repetition code and the other binary sequence forms a parity-check code.

2. The method of claim 1 wherein the modulation schemes are chosen so that points of any one modulation scheme are equidistant from neighbor points of any one other modulation scheme.

3. The method of claim 1 wherein a number of components from the transmitted signal vector taking their value from the second modulation scheme is even.

4. The method of claim 1 wherein one component on the signal vector takes its value from the first modulation scheme and N−1 components on the signal vector take their values from either the secondary modulation scheme or the subset of the first modulation scheme.

5. The method of claim 1 wherein the minimum Euclidean distance within the third and fourth constellations is the same as the minimum Euclidean distance within the first and second constellations.

6. The method of claim 1 wherein each constellation comprises a 4-point constellation.

7. The method of claim 1 wherein the minimum Euclidean distance between vectors comprising each constellation is the same.

8. The method of claim 1 wherein only points of the subset of the first modulation scheme are used.

9. The method of claim 1 wherein the fourth constellation is a π/2 rotation of the third constellation.

10. The method of claim 1 wherein an additional four constellations are derived from a third interpolation and used to increase a number of modulation combinations.

11. A system comprising the plurality of antennae to transmit the signal vector according to the method of claim 1.

12. The system of claim 11 further comprising a receiver arranged to receive the signal vector and to determine the data transmitted in the signal vector.

13. A non-transitory computer readable medium comprising instructions that when executed by a processor cause the processor to carry out the method of claim 1.

* * * * *